(12) United States Patent
Boyer

(10) Patent No.: US 8,701,319 B2
(45) Date of Patent: Apr. 22, 2014

(54) CHANNEL LETTER AND TRIM CAP RETAINING CLIP THEREFOR

(71) Applicant: SignComp, LLC, Grand Rapids, MI (US)

(72) Inventor: Clyde H. Boyer, Concord, OH (US)

(73) Assignee: SignComp, LLC, Grand Rapids, MI (US)

(*) Notice: Subject to any disclaimer, the term of this patent is extended or adjusted under 35 U.S.C. 154(b) by 0 days.

(21) Appl. No.: 13/894,867

(22) Filed: May 15, 2013

(65) Prior Publication Data

US 2013/0255123 A1 Oct. 3, 2013

Related U.S. Application Data

(63) Continuation-in-part of application No. 13/759,517, filed on Feb. 5, 2013.

(60) Provisional application No. 61/619,510, filed on Apr. 3, 2012.

(51) Int. Cl.
*G09F 13/00* (2006.01)

(52) U.S. Cl.
USPC .......................................................... 40/552

(58) Field of Classification Search
USPC ................... 40/552; 349/58; 292/80–91, 303; 24/291, 293, 295
See application file for complete search history.

(56) References Cited

U.S. PATENT DOCUMENTS

| | | |
|---|---|---|
| 1,697,501 A | 1/1929 | Gast |
| 1,721,918 A | 7/1929 | Meyercord |
| 2,141,955 A | 12/1938 | Lang |
| 3,254,436 A | 6/1966 | Bank |
| 3,579,886 A | 5/1971 | Hughes |
| 3,760,552 A | 9/1973 | Skoetsch |
| 3,988,846 A | 11/1976 | Kuhling |
| 4,024,658 A | 5/1977 | Hoerner |
| 4,097,632 A | 6/1978 | Minogue et al. |
| 4,796,170 A | 1/1989 | Pedersen et al. |
| 6,318,585 B1 * | 11/2001 | Asagiri et al. ................ 220/788 |
| 6,481,132 B1 | 11/2002 | Grate et al. |
| 6,748,686 B2 | 6/2004 | Grate et al. |
| 7,096,638 B2 * | 8/2006 | Osterland et al. ............... 52/708 |
| 7,181,875 B2 | 2/2007 | Lewis |
| 7,427,088 B1 * | 9/2008 | Annerino et al. ............ 292/120 |

(Continued)

FOREIGN PATENT DOCUMENTS

WO  WO 2006/006823 A1  1/2006

OTHER PUBLICATIONS

PCT/US2013/024748 International Search Report mailed Apr. 15, 2013, 2 sheets.

*Primary Examiner* — Shin Kim

(74) *Attorney, Agent, or Firm* — Gardner, Linn, Burkhart & Flory, LLP

(57) ABSTRACT

A channel letter has a rear surface for mounting against a raceway, wall, or a structure for supporting the signage, and sheet metal sides defining the figuration of the letter or shape to be depicted. A lighting element is positioned against the rear surface of the enclosure, and a lens is retained to the open front of the enclosure. The lens is secured with a retainer cap and a plurality of retainer clips. Each of the retainer clips comprises as least one side including an outwardly extending leg for retention with the retainer cap.

12 Claims, 14 Drawing Sheets

(56) References Cited

U.S. PATENT DOCUMENTS

| | | | |
|---|---|---|---|
| 8,424,230 B2 * | 4/2013 | Boyer | 40/551 |
| 8,434,251 B2 * | 5/2013 | Lee et al. | 40/780 |
| 8,484,871 B2 * | 7/2013 | Boyer | 40/552 |
| 2002/0104241 A1 | 8/2002 | Grate et al. | |
| 2009/0145011 A1 | 6/2009 | Walton | |

\* cited by examiner

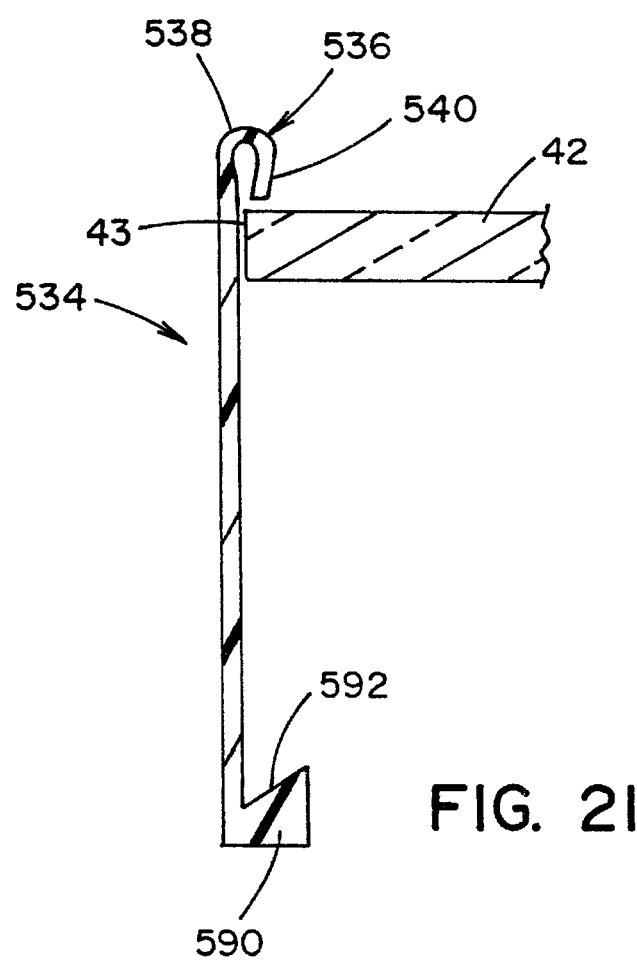

CHANNEL LETTER AND TRIM CAP RETAINING CLIP THEREFOR

This application claims the priority benefit, as a continuation-in-part application, of U.S. application Ser. No. 13/759,517, filed Feb. 5, 2013; which in turn claims the priority benefit of U.S. application Ser. No. 61/619,510, filed Apr. 3, 2012, the disclosures of which are incorporated herein by reference.

FIELD

The present invention relates to channel letters of the type used to create signage and, in particular, to an improved retainer clip for retaining the trim cap and lens to the enclosure of a channel letter.

BACKGROUND

Channel letters are used to provide signage for buildings, shopping malls, and the like where it is desirable that the signage comprise illuminated letters or any other shapes that are easily seen, even at great distances, day or night. Each channel letter consists of an enclosure, usually a metal box, having a rear surface which is positioned against a raceway, or the wall of a building, on which the signage is mounted and a plurality of sides which define the figuration of a letter or number (or other shape) which make up a portion of the sign. A light source, such as a neon tube, LEDs, or other lighting mechanisms, can be positioned within the walls of the enclosure and attached to the rear (and/or side) surface to provide illumination for the letter or shape.

The light sources used in many existing channel letters are neon bulbs requiring high voltage power with transformers built into the metal enclosures. To prevent injury to those servicing such channels letters many municipalities require that such letters be inspected to ensure that they are adequately sealed using standards set by Underwriters Laboratories.

It is expected that relatively new technology in lighting sources will soon become the most prevalent for the manufacturers of channel letters. Specifically, low voltage LED type light sources have been developed which provide a very long lasting bright light without requiring the high voltage and transformers needed for neon lighting. It is expected that channel letters employing the new technology will not be required to meet the same standards set by Underwriters Laboratories for neon tubes.

In addition to the lighting, a channel letter also includes a planar transparent lens, the outer shape of which corresponds to the figuration of the letter or any other shape defined by the sides of the enclosure. The manufacture of the lens requires that the planar panel of transparent plastic be cut to the shape of the enclosure. The lens of existing channel letters have a trim cap glued or welded to the outer edges thereof which form a border to the lens. The trim cap also has a lip which, when assembled to the enclosure, is shaped to fit snugly around the forward ends of the walls thereof for retaining the lens to the enclosure and to maintain the water tight seal required by Underwriters Laboratories. Heretofore, typically screws are threaded through the lips of the trim cap and into the enclosure walls to retain the lens across the forward opening of the enclosure.

It would be desirable to provide a channel letter assembly having a lens and trim cap which could be installed without incurring the labor intensive, and aesthetically displeasing, step of attaching the trim cap with screws. It would also be desirable to provide a less cumbersome method of disassembling the trim cap and lens to gain access to the interior of the enclosure of a channel letter.

SUMMARY

Briefly, the present invention is embodied in a channel letter. For the purposes of this description, a channel letter is defined as an illuminated contoured fixture in the shape of a letter of the alphabet, a numeral, an element of punctuation such as a comma, an exclamation point, or any other shape or form intended to constitute a portion of a sign advertisement or display.

The channel letter of the present invention has a rear surface for mounting against a raceway, a wall, or any other structure suitable for supporting the signage. The walls defining the figuration of the letter or shape to be depicted are made of sheet metal, or plastic, having a given thickness. A lighting element, such as a strip of LEDs according to the newly available technology or any other light source, is positioned against, or proximal to, the rear surface of the enclosure to provide illumination therefore.

A channel letter comprising an enclosure having at least two opposing walls, wherein the at least two opposing walls defining the shape of the letter and having an open front; the at least two opposing walls having an inner surface and a forward end; a lens having a forward surface and an outer edge in the shape of the letter; a plurality of selectively positioned and oriented retention clips adjacent the forward end frictionally engaged with the enclosure walls; each clip includes an outwardly extending leg relative to the walls; a retainer cap against the forward surface of the lens for retaining the lens adjacent the enclosure and the walls; the retainer cap comprises an extrusion readily formable into a variety of shapes; the retainer cap includes an interior face having a first edge and an opposing second edge; the first edge having an overhang engaged to the forward surface of the lens; and, the second edge having channel, wherein the channel adapted to securely engage a plurality of the legs along an outer surface of the enclosure walls.

A channel sign assembly comprising an enclosure having at least two opposing walls, the at least two opposing walls defining the shape of the sign assembly and having an open front; the at least two opposing walls having an inner surface and a forward end; the walls including a plurality of intermittent retention clips mounted adjacent to the forward end; each clip includes an outwardly extending leg relative to the walls; the legs are aligned with and offset from the forward end; a planar lens having a forward surface, and an outer edge in the defined shape of the sign and sized to fit within the at least two opposing walls of the enclosure; a retainer cap against the forward surface of the lens for retaining the lens within the enclosure and against the walls; the retainer cap comprises an extrusion readily formable into a variety of shapes; the retainer cap includes an interior face having a first edge and an opposing second edge; the first edge having an overhang engaged with the forward surface of the lens; and, the second edge forming a retention channel, wherein the channel adapted to securely engage a plurality of the legs along an outer surface of the enclosure walls.

A channel sign assembly comprising an enclosure having at least two opposing walls, the at least two opposing walls defining the shape of the sign assembly and having an open front; the at least two opposing walls forming a forward end; the walls including a plurality of intermittent retention clips mounted adjacent to the forward end; each clip mounted in a first orientation includes a first outwardly extending leg relative to the walls; the legs are aligned with and offset from the forward end; a planar lens having a forward surface and an outer edge in the defined shape of the sign; a retainer cap mounted against the forward surface of the lens for retaining the lens within the enclosure and against the walls; the retainer cap comprises an extrusion readily formable into a variety of shapes; the retainer cap includes an interior face having a first edge and an opposing second edge; the first edge having an overhang engaged with the forward surface of the lens; and, the second edge forming a retention channel, wherein the channel adapted to securely engage a plurality of the legs along an outer surface of the enclosure walls.

A channel sign assembly comprising an enclosure having at least two opposing walls, the at least two opposing walls defining the shape of the sign assembly and having an open front; the at least two opposing walls forming a forward end; the walls including a plurality of intermittent retention clips mounted adjacent to the forward end; each clip includes a unitary structure comprising a top edge, a planar body, and an outwardly extending leg relative to the body. The plurality of clips and associated legs are aligned with and offset from the forward end. The sign assembly further includes a planar lens having a forward surface and an outer edge in the defined shape of the sign. A retainer cap can be mounted against the forward surface of the lens for retaining the lens within the enclosure and against the walls. The clips further comprise double faced adhesive tape including a first face of the tape secured to a mounting side of the body of the clip; a second face of the tape secured to an outer surface of the walls; and, the top edge of the clip including a first portion generally at about 90 degrees to the body for resting on the forward end and stopping the clip at the proper mounting position.

BRIEF DESCRIPTION OF THE DRAWINGS

A better and more complete understanding of the present invention will be had after a reading of the following detailed description taken in conjunction with the drawings wherein.

DETAILED DESCRIPTION

Figure 1:
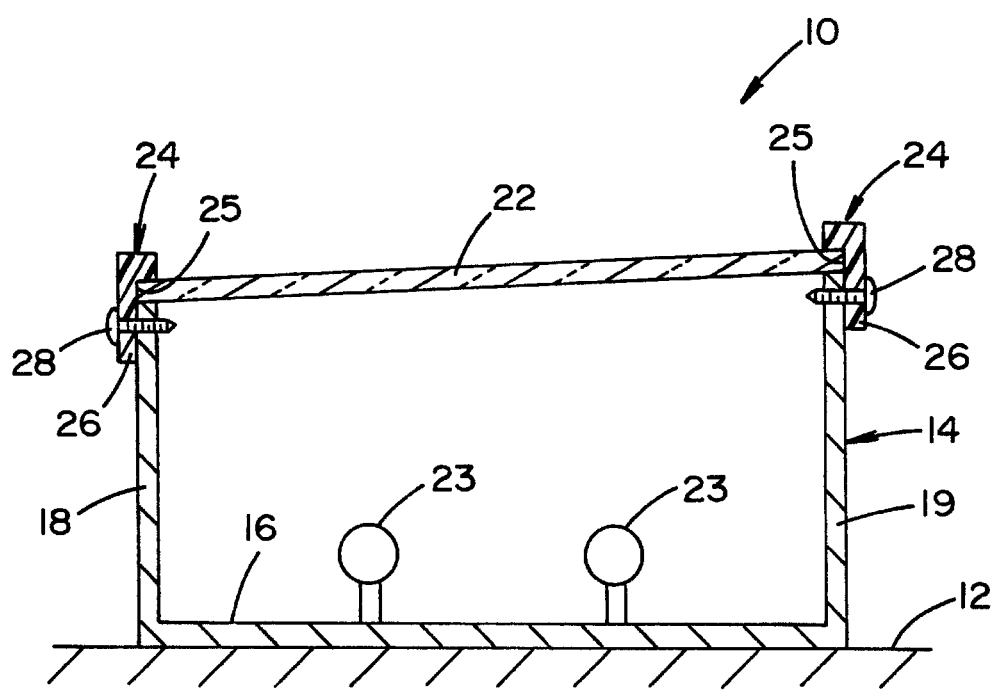
FIG. 1 is an enlarged cross sectional view of channel letter walls, lens, and trim cap assembly shown with screws retaining the trim cap to the walls of the enclosure as is known in the art.

Referring to FIG. 1, a channel letter assembly 10 according to the prior art is mounted on a supporting structure 12. As shown, the channel letter assembly 10 includes a metal enclosure 14 having a rear surface 16 and a plurality of side walls 18, 19 which are contoured to define the edges of a letter 10. The forward edges of the sidewalls 18, 19 define a plane and fitted across the forward edges is a transparent lens 22 having a shape corresponding to that defined by the walls 18, 19 of the enclosure 14. Retained to the rear surface 16 of the enclosure 14 is a light source 23, which can extend through the length of the channel letter 10 thereby illuminating the entire surface of the lens 22.

In accordance with the prior art, the lens 22 is retained to the side walls 18, 19 of the enclosure 14 by a trim cap 24. The trim cap 24 typically includes a plastic border member which can be glued, welded, or secured 25 to the outer edges of the lens 22. The trim cap 24 has a rearwardly extending lip 26 that fits over the forward edges of the side walls 18, 19. The trim cap 24 and the lens 22 are retained to the enclosure member 14 by a plurality of screws 28. The screws 28 pass through the trim cap's rearwardly extending lip 26 and screw into the sheet metal side walls 18, 19 of the enclosure 14.

The manufacture of a channel letter 10 in accordance with the prior art requires the construction of the enclosure 14, the manufacture of light fixtures 23 and the lens 22. Manufacture of the lens 22 requires cutting a transparent acrylic or plastic material into the shape of the channel letter 10 and attaching the trim cap 24 around the edges thereof. The trim cap 24 is then secured to the edges of the lens 22 via screws 28. The trim cap 24 is intended to meet the present sealing standards set by Underwriters Laboratories, but such standards may not be needed (or may result in different standards) for channel letters which employ the new LED technology. It would, therefore, be desirable to provide a less expensive and less cumbersome method of attaching a lens 22 to the enclosure of the channel letter 10. In addition, it would be desirable to provide a method that facilitates disassembly of the trim cap 24 and lens 22 from the enclosure for maintenance of the light fixture 23, and other components, within the enclosure.

Trim cap 24 can come in rolls and may be cut to any length. It can essentially be shaped to any configuration or size and is used to trim Plexiglas® letters or shapes (i.e. lens 22) by chemically welding the trim cap 24 to the plastic shapes 22. The letters or shapes 22 can then be placed on a channel which can contain neon or LED lighting to illuminate the letters or shapes. The result is a three-dimensional illuminated letter or shape. As discussed above, prior attachment means for securing the trim cap 24 to the outside of the metal channel 18, 19 comprise holes drilled through the trim cap 24 and the metal channel 18, 19 followed by screws 28 driven through the trim cap 24 into the metallic channel 18, 19 (i.e. for securing the trim cap thereto).

The use of screws is undesirable for a number of reasons. Screws are not aesthetically acceptable and they create depressions in the trim cap 24. Although not shown, the screws 28 peel when painted to match the trim cap 24 and can rust and freeze making it difficult to remove for servicing the sign assembly. The screws 28 cause staining (i.e. rust streaks along the walls 18, 19) and often crack the trim cap 24. Thus, there is a need for an improved system for assembling trim cap letters and numbers to a supporting channel.

Referring to FIGS. 2-8, and in accordance with the present disclosure, a channel letter assembly 100 having a retaining clip 32 is therein displayed. The clip 32 provides a means for securing a trim cap or retainer cap 34 to the walls 38, 39 of the enclosure 44. It is to be appreciated that trim cap 34 can include a metal insert 35 (i.e. aluminum) extending therethrough in order to provide rigidity and formability to the trim cap 34 shape. The metal insert 35 can be positioned adjacent to an exterior side or imbedded within the interior of trim cap 34. The insert 35 can extend through a portion of trim cap 34 or through substantially the entire cross section of trim cap 34. To facilitate retention of a lens 42 against the front edges 58, 59 of the walls 38, 39 of the enclosure 44, a plurality of the retainer clips 32 are spaced along the front edges or terminal ends 58, 59 of the walls 38, 39 of the enclosure 44. Each of the retainer clips 32 can comprise a unitary generally u-shaped rigid body 60 having a first side 62, a second side 64, and an arched back 66 connecting the two sides 62, 64. Each of the sides 62, 64 includes a leg 63, 65 extending therefrom. The legs 63, 65 extend in a y-shape relative to each other and sides 62, 64. The legs 63, 65 form an enlarged receiving opening 70 for placement of the clip 32 onto the terminal ends 58, 59 of the side walls 38, 39 of the enclosure 44. The legs 63, 65 are spaced from each other at a first end and form a first spaced distance 72 that is significantly greater than the given thickness of the sheet metal of the walls. The legs 63, 65 taper towards each other at a second end to form a second spaced distance 74 that is slightly greater than the thickness of the sheet metal of the walls. A plurality of rigid barbs 80, 82, 84, 86 extend from the inner surface of the sides 62, 64, of the u-shaped body 60, and into the space between the first side 62 and the second side 64. In one embodiment, the barbs 80, 82, 84, 86 are crimped from the edges of both sides of the body 60. The number and spacing of the barbs can vary. In one arrangement, barbs 80, 82 are formed from a left edge and a right edge of the first side 62; and, barbs 84, 86 are formed from a left edge and a right edge of the second side 64. The body, legs, and barbs of the retainer clip 32 can be made from metal (i.e. stainless steel). The barbs 80, 82, 84, 86 can be arranged such that they are not perpendicular to the sides 62, 64 of the u-shaped body 60 from which they project, but are oriented at an angle with respect to the perpendicular with a component of the angle extending toward the arched back 66. The angled orientation of the barbs 80, 82, 84, 86 permit the clip 32 to be easily fitted over the terminal ends 58, 59 of the side walls 38, 39 of the enclosure 44 but resist removal of the retainer clip 32 once it has been installed. A plurality of such retainer clips 32 can be positioned around the outer edge of the walls thereby providing an attachment means for the trim cap 34 and lens 42 to the walls 38, 39 of the enclosure 44. Retaining the trim cap 34 to the walls 38, 39 of the enclosure in turn provides the means for securing the lens 42 to the enclosure walls 38, 39 thereby providing a water resistant cover to the interior of the enclosure 44.

Figure 2:
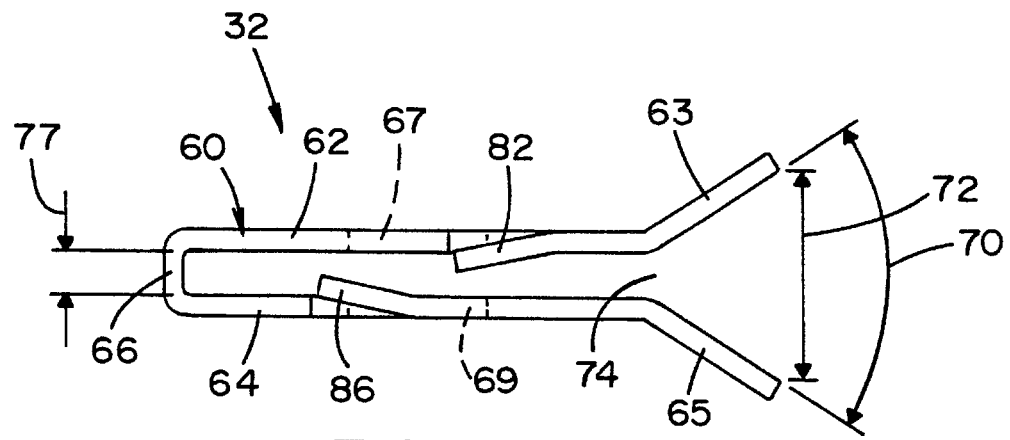
FIG. 2 is an edge view of the retainer clip.
Figure 3:
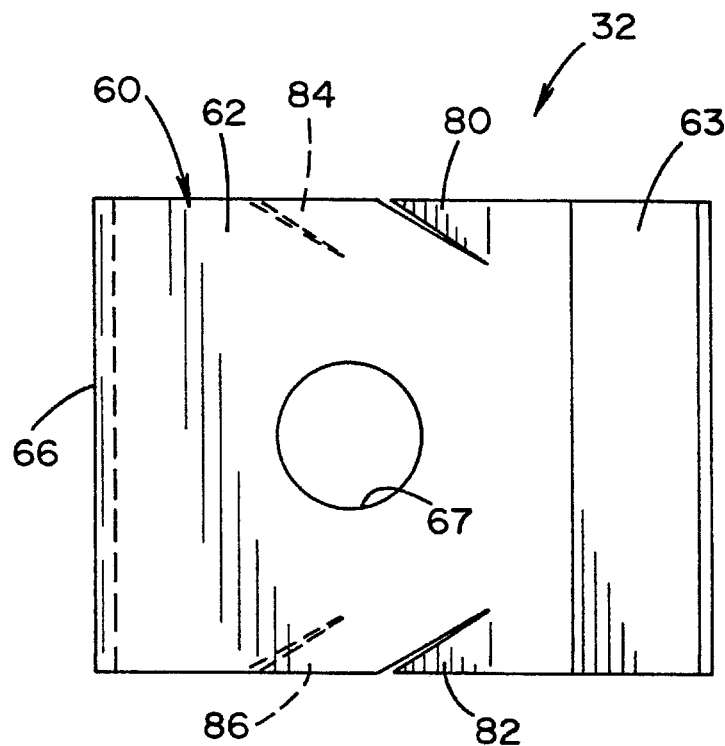
FIG. 3 is a front side view of the retainer clip.
Figure 4:
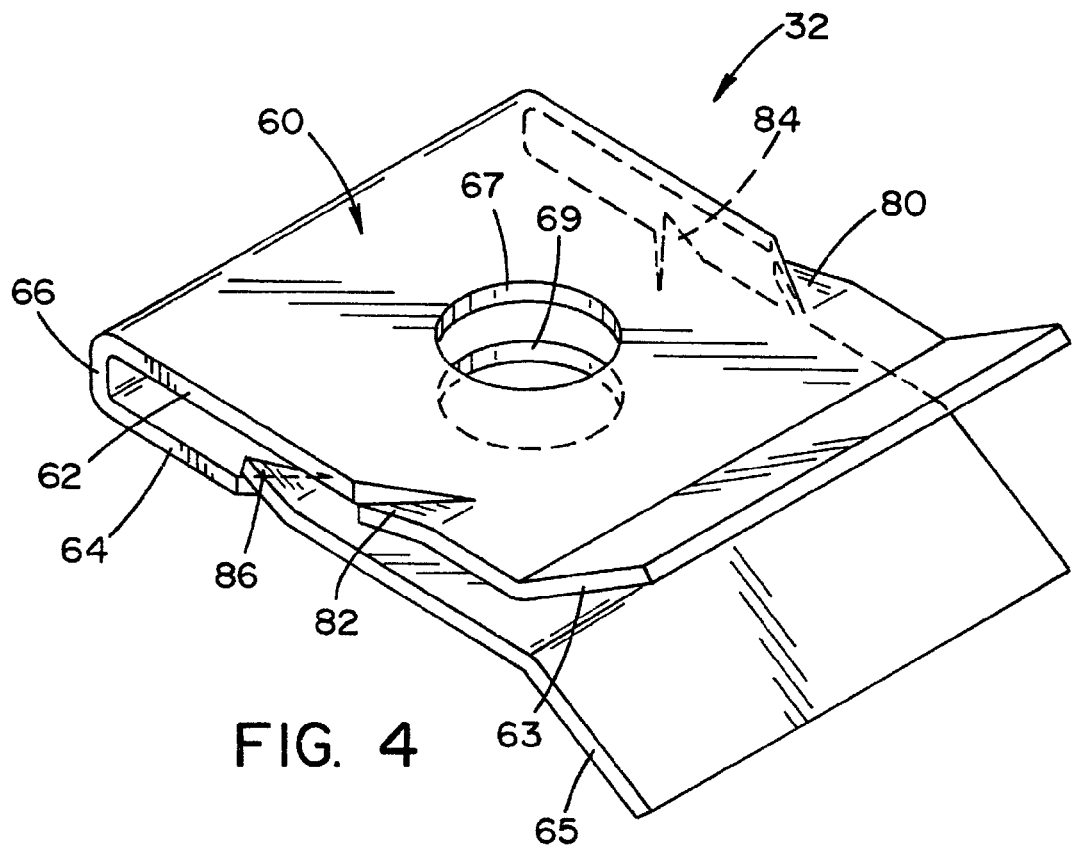
FIG. 4 is a perspective view of the retainer clip.
Figure 5:
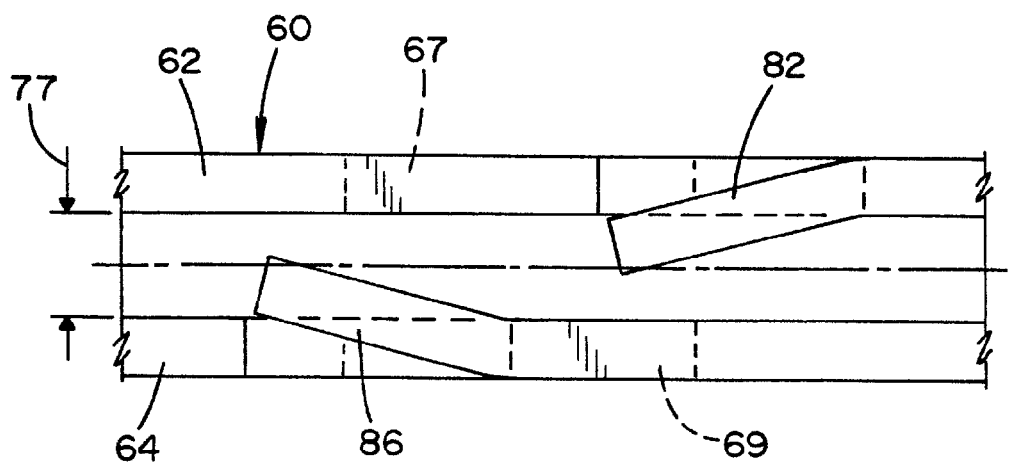
FIG. 5 is an enlarged partial edge view of the retainer clip.

As best shown in FIGS. 2 and 5, the barbs 80, 82, 84, 86 may be positioned on either or both of the sides 62, 64 and can extend at least half the distance, or substantially half the distance 77, between the sides 62, 64. It should be appreciated that the walls of an enclosure for a small channel letter can be made of a thinner gauge of metal than the walls of a larger channel letter, and therefore the spacing between the legs of a retainer clip can be made to accept more than one gauge of metal. It should also be appreciated that the retainer clips 32 may be manufactured in more than one size to provide desirable fitting between the sides and clips in order to accommodate a variety of wall thicknesses (and materials), and a variety of trim cap sizes. It is to be appreciated that the channel enclosure can be made from non-metal materials (i.e. rigid or semi-rigid plastics). Non-metal materials can be used in conjunction with clips 32 discussed herein.

Referring to FIGS. 6A, 6B, and 7-9, the retainer clip 32 is fitted on the forward end 58 of a wall 38 with the second or exterior leg 65 extending outward away from the wall 38. The retaining clip 32 can be easily installed because the barbs 80, 82, 84, 86 and sides 62, 64 will readily flex as the sides 62, 64 are moved along the opposing surfaces of the wall 38 until the forward end 58 of the wall 38 is against the arched back 66 of the clip 32 as shown. When all the retainer clips 32 have been installed along the walls 38, 39 of the enclosure 44 the lens 42 can be positioned to rest on the outer surface of the arched backs 66 of the clips 32. Referring to the figures, it is to be appreciated that after a retainer clip 32 has been installed, the angularly oriented barbs 80, 82, 84, 86 will resist removal of the retainer clip 32. This is because friction between the surfaces of the wall 38, 39 and the free end of the barbs 80, 82, 84, 86 will wedge the barbs between (and into) the surface of the wall 38, 39 and the associated side.

The retainer clip 32 is depicted as having two barbs 80, 82 extending from opposing edges of one side 62 and two barbs 84, 86 extending from opposing edges of the other side 64. It is to be appreciated that the barbs 80, 82, 84, 86 could be arranged in any number of configurations on the opposing sides 62, 64 of the retaining clip.

In accordance with the present invention, to retain the lens against the terminal ends of the shoulder a plurality of retainer clips are spaced along the outer end of the walls of the enclosure. Each of the retainer clips can comprise a unitary generally u-shaped rigid body having a first side, a second side, and an arched back connecting the two sides. Each of the sides includes a leg extending therefrom. The legs extend in a y-shape relative to each other. The legs form an enlarged receiving opening for placement of the clip onto a terminal or forward end of a side wall of the enclosure. The legs are spaced from each other at a first end and form a first spaced distance that is significantly greater than the given thickness of the sheet metal of the walls. The legs taper towards each other at a second end to form a second spaced distance that is slightly larger than the thickness of the side wall of the enclosure. A plurality of rigid barbs extends from the inner surface of the sides of the u-shaped body and into the space between the sides. In one embodiment, the barbs are crimped along edges of both sides of the body. The number and spacing of the barbs can vary. In one arrangement, barbs are formed from a left edge and a right edge of the first side; and, formed from a left edge and a right edge of the second side. The body, legs, and barbs of the retainer clip can be made from rigid metal (i.e. stainless steel). Also, the barbs are not perpendicular to the sides of the u-shaped body from which they project, but are at an angle with respect to the perpendicular with a component of the angle extending toward the arched back. The angled orientation of the barbs permit the clip, using onehanded pressure, to be slid over the terminal or front ends of the side walls of the enclosure (in a first direction) but resist removal of the retainer clip once it has been installed (in a second opposing direction). It is to be appreciated that the rigid barbs 80, 82, 84, 86, can "bite" into relatively softer metal walls (i.e. aluminum) and non-metal walls as the clip 32 is slid over the ends of the walls 38, 39 of the enclosure 44 in the first direction. The "biting" of the barbs 80, 82, 84, 86 into the walls 38, 39, coupled with the angled orientation of the barbs, resists removal of the clip 32 when moved in a second direction opposed to the first direction. To further secure the clips 32 to the enclosure walls 38, 39, a rivet or similar (not illustrated) can be installed through the aligned openings 67, 69 in the sides 62, 64 of the clips 32 and through a corresponding wall 38, 39. A plurality of such retainer clips can be positioned around the front edge of the walls thereby providing an attachment means for the trim cap to the walls of the enclosure. Retaining the trim cap (in place) in turn provides the means for securing the lens to the enclosure walls.

Figure 6A:
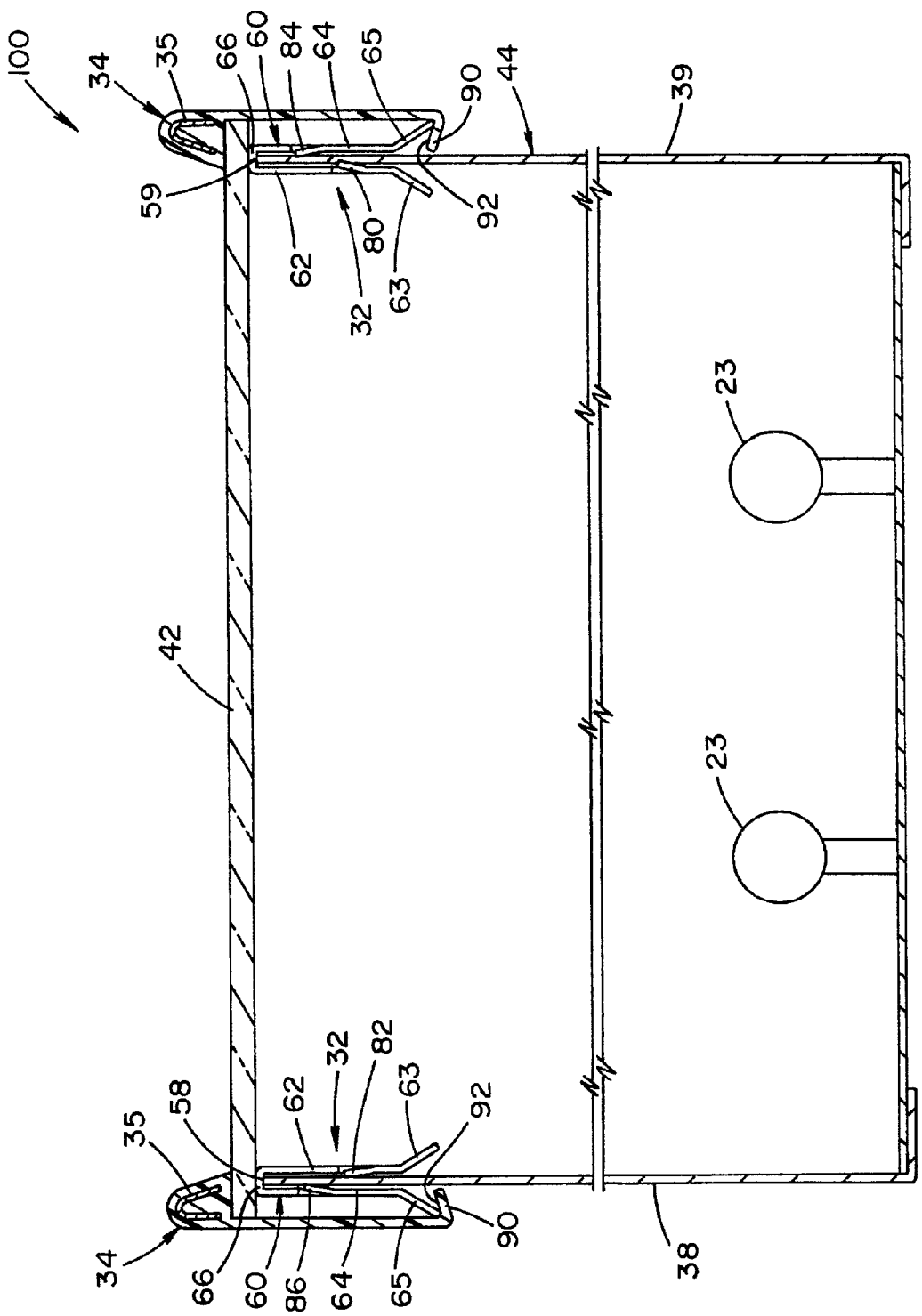
FIG. 6A is a cross sectional view of the channel letter assembly employing the retainer clip in accordance with the present invention and a first embodiment of trim cap.

Referring to FIG. 6A, the channel sign assembly 100 in accordance with the present disclosure, including a first embodiment of trim cap 34, is therein displayed. The assembly includes a metal enclosure 44 having a plurality of sheet metal side walls 38, 39. The retainer, snap cap, or trim cap 34 can be attached, i.e. firmly glued to the lens 42. The lens 42 and retainer cap 34 provide lateral support to the walls 38, 39. The lens 42 and the retainer cap 34 prevent the walls 38, 39 from moving towards each other and from bowing outward away from each other.

The clips 32, once installed, provide a tab or leg 65 that extends outward away from the walls 38, 39 of the channel and can engage a foot 90 of the retainer cap (i.e. in a 'snap cap' or friction engagement arrangement). The foot 90 can extend in a length from about ¼ inch to about 1¼ inches. The foot 90 of the retainer cap 34 can be in the form of a receiver or retention channel having a face 92 angled upward from about 3 degrees to about 9 degrees from horizontal. In one arrangement, the receiver can be angled upward from about 5 degrees to about 7 degrees from horizontal.

The clips 32 can be placed onto the channel walls 38, 39 at random positions around the letter or shape at the discretion of an installer. The number and intermittent spacing of the clips 32 will be dependent upon the size and design of the channel sign. The interlocking effect of the foot 90 of the retainer cap 34 to the tabs 65 will enable secure attachment of the plastic lens 42 and retainer cap 34 to the metallic channel 38, 39.

The tabs 65 of the clips 32 can be positioned such that they are aligned with and proximal to the front edge 58, 59 of the side walls 38, 39. The friction "locking" effect of the barbs enables a positive engagement of the inside faces of the clip 32 to the forward edge and forward side portions of the metallic channel 38, 39.

Figure 6B:
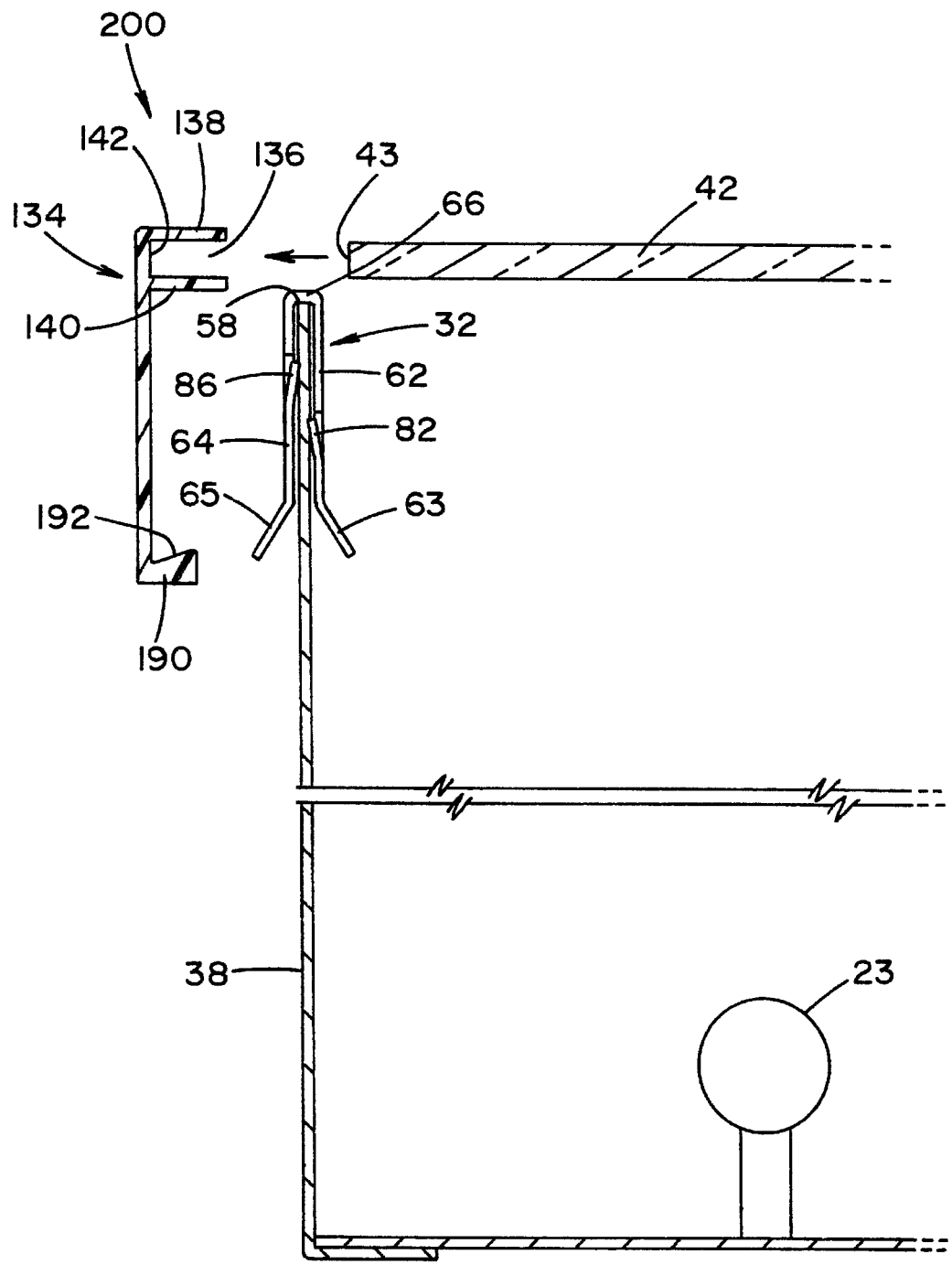
FIG. 6B is a cross section view of the letter assembly employing the retainer clip in accordance with the present invention and a second embodiment of trim cap.

FIG. 6B shows a cross-sectional view of the clip 32 as it would be aligned with the front edge of the side walls in conjunction with a second embodiment of trim cap 134. Trim cap 134, or channel letter assembly 200, includes a slot 136 for receiving the edge 43 or lens 42. The slot 136 includes an upper leg 138, a lower leg 140, and a back edge 142. The trim cap 134 further includes a foot 190 for engaging leg 65 of clip 32. The foot 190 can be in the form of a receiver or retention channel having an angled face 192. The angled face 192 can be from above 3 degrees to about 9 degrees from horizontal. The angled face 192 and foot 190 provide a "snap fit" with leg 65 thereby securing trim cap 134 to clip 32, wall 38, and lens 42.

Figure 7:
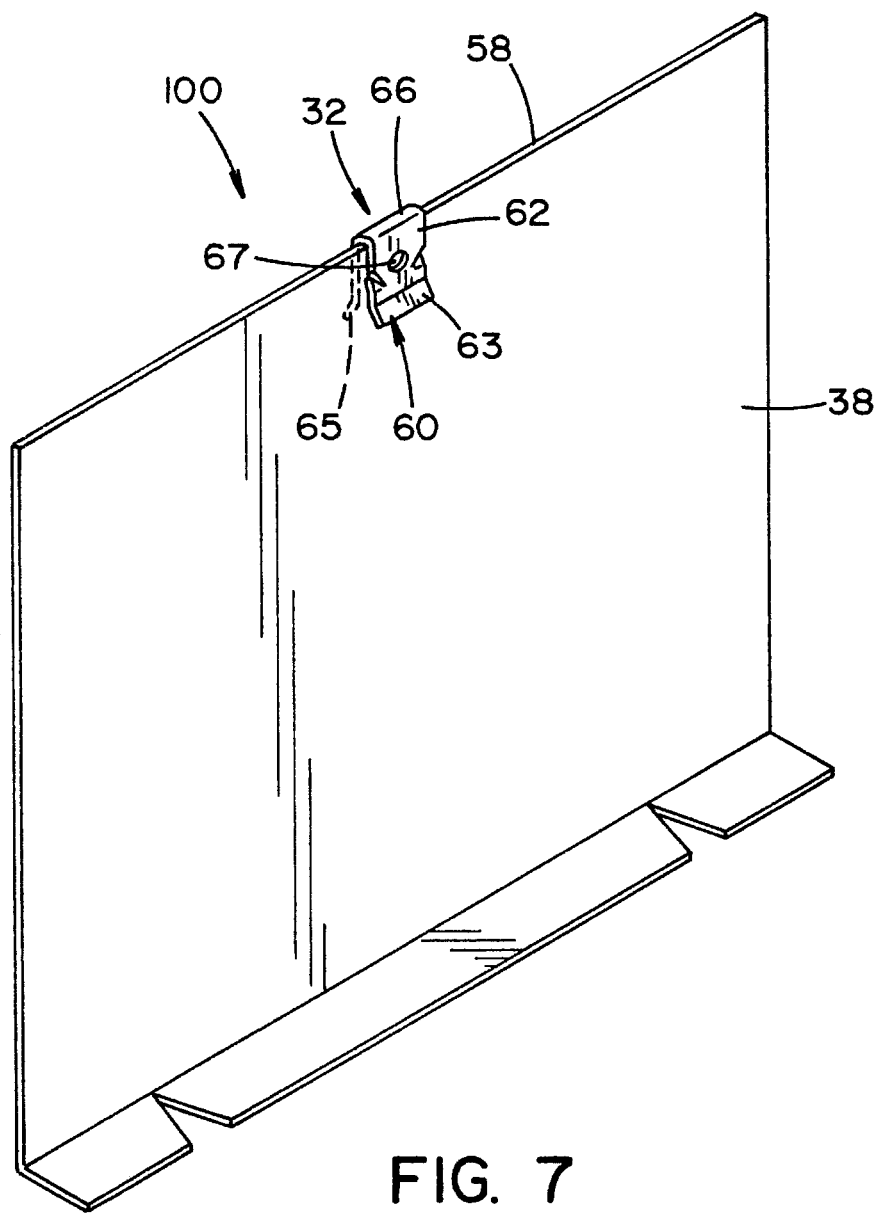
FIG. 7 is a perspective view of a side wall of an enclosure with a retainer clip mounted thereon.
Figure 8:
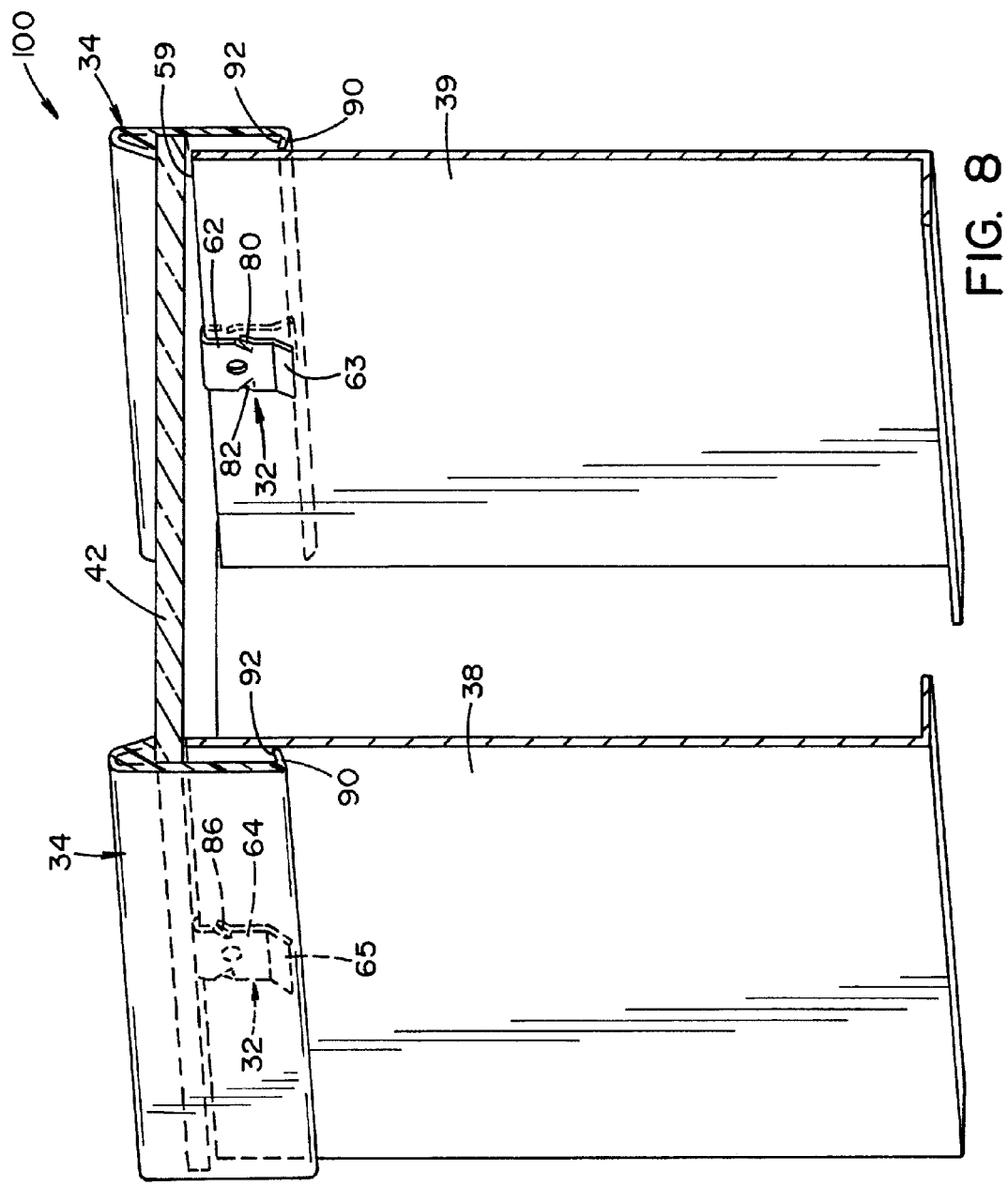
FIG. 8 is a perspective view of a side wall of an enclosure with the retainer clip mounted thereon along with the trim cap mounted thereto and the lens positioned thereabove.

FIGS. 7 and 8 show perspective views of the clip 32 as mounted to the side walls 38, 39.

In furtherance of the above described retainer cap 34, 134, a simple lever tool (i.e. two-pronged) angled lever can be used to facilitate the detachment or removal of the plastic retainer or snap cap from the walls (i.e. metallic or non-metallic). The retainer cap 34, 134 can be detached from the clips 32 using this separate tool which can be manually lever driven. The lever tool can release the retainer cap 34, 134 much as a bottle opener locks under a lid to pop the lid off using a lever action.

When a channel sign assembly 100, 200 is assembled using the clips 32 as described, the finished product will present a more attractive appearance than one assembled using screws. In addition, when it is time to service the sign assembly to replace LEDs, or other devices, the snap/retainer cap 34, 134 can be pried off using the simple lever device. The lever device can reach between the retainer cap and the side wall 38, 39 and then pull the receiver edge 92, 192 of the retainer cap 34, 134 respectively, outward in order to free the edge 92, 192 from the terminal end of the outward side 65 of the clip 32. This prying process can be continued for several clips 32 which will enable the service technician to free the entire perimeter, or a desired portion thereof, of the retainer cap 34, 134 from the forward end 58, 59 of the channel sign enclosure 44 without the use of a screwdriver and the cumbersome removal of screws.

Referring to FIGS. 9-12, and in accordance with the present disclosure, a channel letter assembly 300 having a retaining clip 232 (according to a second embodiment) is therein displayed. The clip 232 provides a means for securing a trim cap or retainer cap 34 to the walls 38, 39 of the enclosure 44. To facilitate retention of a lens 42 against the front edges 58, 59 of the walls 38, 39 of the enclosure, a plurality of the retainer clips 232 are spaced along the front edges or terminal ends 58, 59 of the walls 38, 39 of the enclosure. Each of the retainer clips 232 can comprise a unitary generally u-shaped rigid body 260 having a first side 262, a second side 264, and an arched back 266 connecting the two sides 262, 264. Each of the sides 262, 264 includes a leg 263, 265 extending therefrom. The first leg 263 extends linearly from side 262. The second legs 265 extends in a y-shape relative to the first side 262 and leg 263. The legs 263, 265 form an enlarged receiving opening 270 for placement of the clip 232 onto the terminal ends 58, 59 of the side walls 38, 39 of the enclosure 44. The legs, 263, 265 are spaced from each other at a first end and form a first spaced distance 272 that is significantly greater than the given thickness of the sheet metal of the walls. The leg 265 tapers toward leg 263 at a second end to form a second spaced distance 274 that is slightly greater than the thickness of the sheet metal of the walls. A plurality of rigid barbs 280, 282, 284, 286 extend from the inner surface of the sides 262, 264, of the u-shaped body 260, and into the space between the first side 262 and the second side 264. In one embodiment, the barbs 280, 282, 284, 286 are crimped from the edges of both sides of the body 260. The number and spacing of the barbs can vary. In one arrangement, barbs 280, 282 are formed from a left edge and a right edge of the first side 262; and, barbs 284, 286 are formed from a left edge and a right edge of the second side 264. The body, legs, and barbs of the retainer clip 232 can be made from metal (i.e. stainless steel). The barbs 280, 282, 284, 286 can be arranged such that they are not perpendicular to the sides 262, 264 of the u-shaped body 260 from which they project, but are oriented at an angle with respect to the perpendicular with a component of the angle extending toward the arched back 266. The angled orientation of the barbs 280, 282, 284, 286 permit the clip 232 to be easily fitted over the terminal ends 58, 59 of the side walls 38, 39 of the enclosure 44 but resist removal of the retainer clip 232 once it has been installed. A plurality of such retainer clips 232 can be positioned around the outer edge of the walls thereby providing an attachment means for the trim cap 34 and lens 42 to the walls 38, 39 of the enclosure 44. Retaining the trim cap 34 to the walls 38, 39 of the enclosure in turn provides the means for securing the lens 42 to the enclosure walls 38, 39 thereby providing a water resistant cover to the interior of the enclosure 44.

Figure 9:
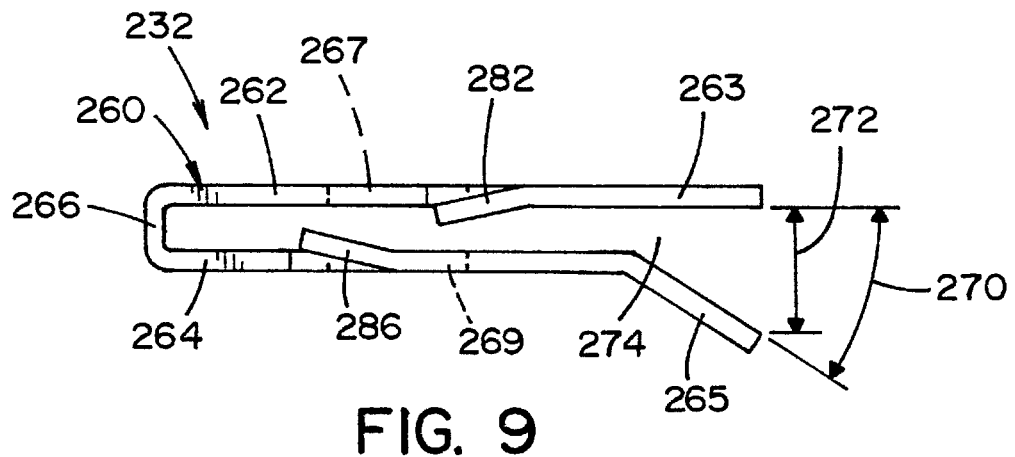
FIG. 9 is an edge view of a retainer clip according to a second embodiment.
Figure 10:
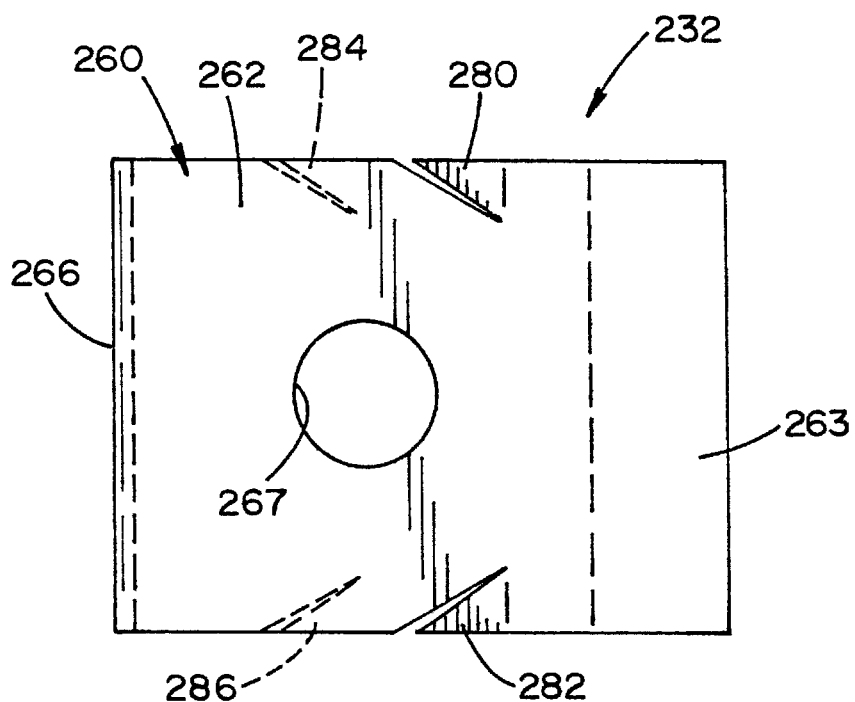
FIG. 10 is a front side view of the retainer clip of FIG. 9.
Figure 11:
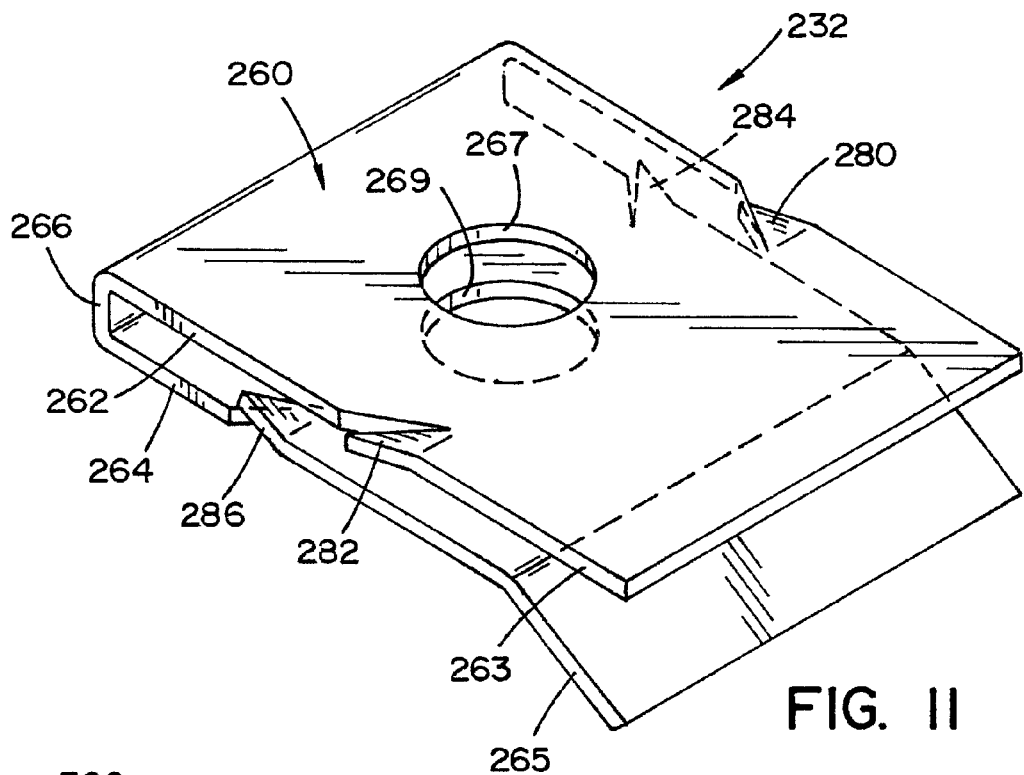
FIG. 11 is a perspective view of the retainer clip of FIG. 9.

As best shown in FIG. 9, the barbs 280, 282, 284, 286 may be positioned on either or both of the sides 262, 264 and can extend at least half the distance, or substantially half the distance, between the sides 262, 264. It should be appreciated that the walls of an enclosure for a small channel letter can be made of a thinner gauge of metal than the walls of a larger channel letter, and therefore the spacing between the legs of a retainer clip can be made to accept more than one gauge of metal. It should also be appreciated that the retainer clips 232 may be manufactured in more than one size to provide desirable fitting between the sides and clips in order to accommodate a variety of wall thicknesses (and materials), and a variety of trim cap sizes. It is to be appreciated that the channel enclosure can be made from non-metal materials (i.e. rigid or semi-rigid plastics). Non-metal materials can be used in conjunction with clips 232 discussed herein.

Figure 12:
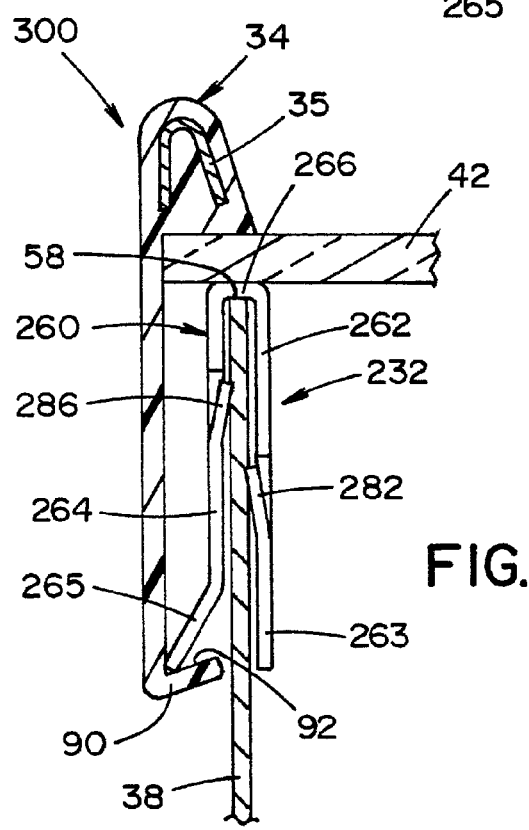
FIG. 12 is a cross sectional view of the channel letter assembly employing the retainer clip of FIG. 9 in accordance with the present invention.
Figure 13:
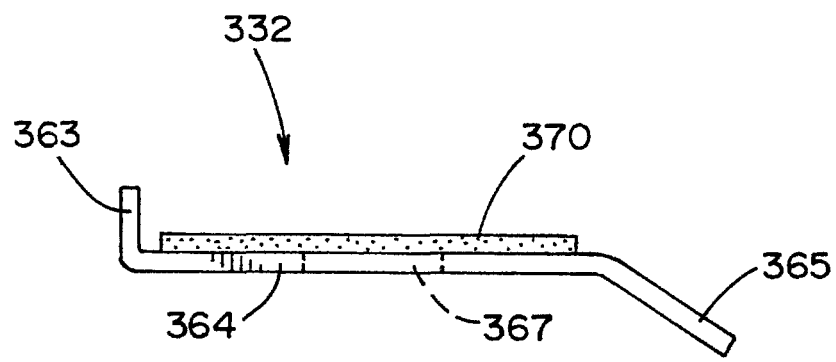
FIG. 13 is an edge view of a retainer clip according to a third embodiment.
Figure 14:
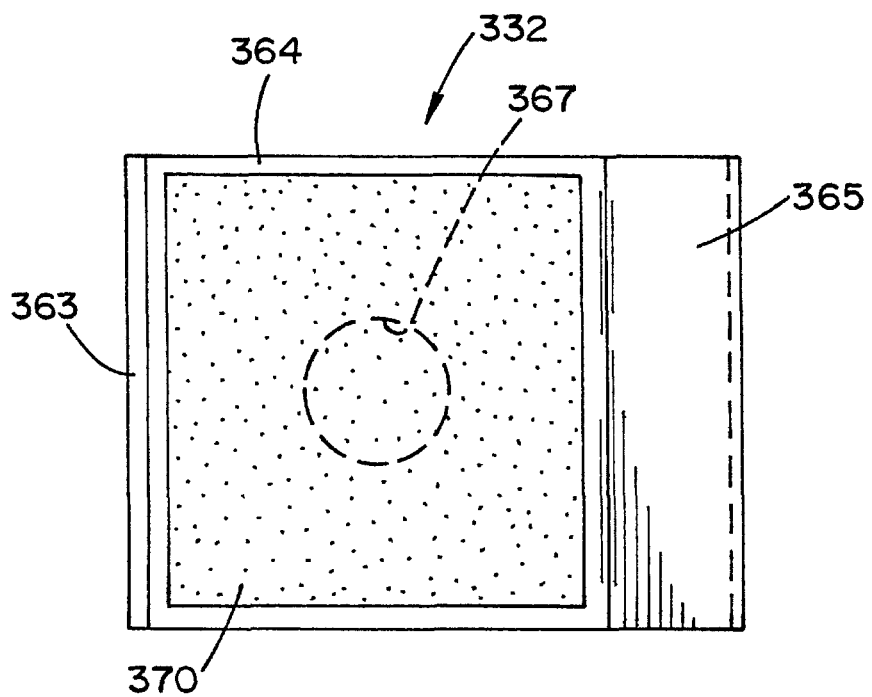
FIG. 14 is a front side view of the retainer clip of FIG. 13.
Figure 15:
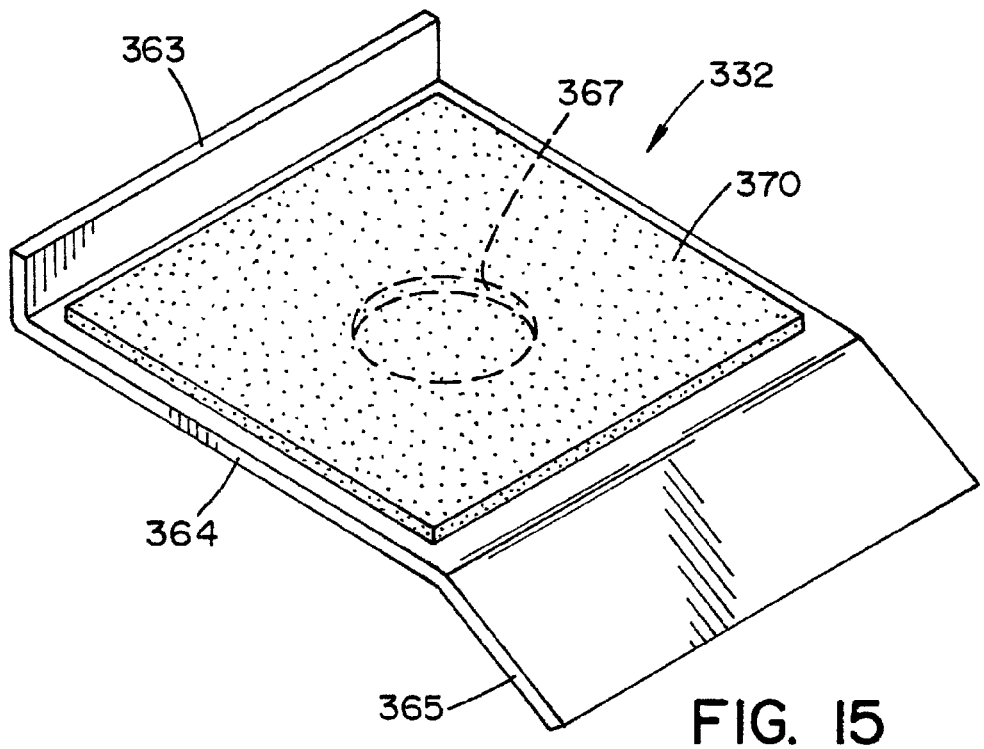
FIG. 15 is a perspective view of the retainer clip of FIG. 13.

Referring to FIG. 12, the retainer clip 232 is fitted on the forward end 58 of a wall 38 with the second or exterior leg 265 extending outward away from the wall 38. The retaining clip 232 can be easily installed because the barbs 280, 282, 284, 286 and sides 262, 264 will readily flex as the sides 262, 264 are moved along the opposing surfaces of the wall 38 until the forward end 58 of the wall 38 is against the arched back 266 of the clip 232 as shown. When all the retainer clips 232 have been installed along the walls 38, 39 of the enclosure 44 the lens 42 can be positioned to rest on the outer surface of the arched backs 266 of the clips 232. Referring to the figures, it is to be appreciated that after a retainer clip 232 has been installed, the angularly oriented barbs 280, 282, 284, 286 will resist removal of the retainer clip 232. This is because friction between the surfaces of the wall 38, 39 and the free end of the barbs 280, 282, 284, 286 will wedge the barbs between (and into) the surface of the wall 38, 39 and the associated side.

To further secure the clips 232 to the enclosure walls 38, 39, a rivet or similar (not illustrated) can be installed through the aligned openings 267, 269 in the sides 262, 264 of the clips 232 and through a corresponding wall 38, 39. A plurality of such retainer clips can be positioned around the front edge of the walls thereby providing an attachment means for the trim cap to the walls of the enclosure. Retaining the trim cap (in place) in turn provides the means for securing the lens to the enclosure walls.

Referring to FIG. 12, the channel sign assembly 300 in accordance with the present disclosure, including a first embodiment of trim cap 34, is therein displayed. The assembly includes a metal enclosure having a plurality of sheet metal side walls 38, 39. The retainer, snap cap, or trim cap 34 can be attached, i.e. firmly glued to the lens 42. The lens 42 and retainer cap 34 provide lateral support to the walls 38, 39. The lens 42 and the retainer cap 34 prevent the walls 38, 39 from moving towards each other and from bowing outward away from each other.

The clips 232, once installed, provide a tab or leg 265 that extends outward away from the walls 38, 39 of the channel and can engage a foot 90 of the retainer cap (i.e. in a 'snap cap' or friction engagement arrangement). The foot 90 can extend in a length from about ¼ inch to about 1¼ inches. The foot 90 of the retainer cap 34 can be in the form of a receiver or retention channel having a face 92 angled upward from about 3 degrees to about 9 degrees from horizontal. In one arrangement, the receiver can be angled upward from about 5 degrees to about 7 degrees from horizontal.

The clips 232 can be placed onto the channel walls 38, 39 at random positions around the letter or shape at the discretion of an installer. The number and intermittent spacing of the clips 232 will be dependent upon the size and design of the channel sign. The interlocking effect of the foot 90 of the retainer cap 34 to the tabs 265 will enable secure attachment of the plastic lens 42 and retainer cap 34 to the metallic channel 38, 39.

The tabs 265 of the clips 232 can be positioned such that they are aligned with and proximal to the front edge 58, 59 of the side walls 38, 39. The friction "locking" effect of the barbs enables a positive engagement of the inside faces of the clip 232 to the forward edge and forward side portions of the metallic channel 38, 39.

Referring to FIGS. 13-16, and in accordance with the present disclosure, a channel letter assembly 400 having a retaining clip 332 (according to a third embodiment) is therein displayed. The clip 332 provides a means for securing a trim cap or retainer cap 34 to the walls 38, 39 of the enclosure 44. To facilitate retention of a lens 42 against the front edges 58, 59 of the walls 38, 39 of the enclosure 44, a plurality of the retainer clips 332 are spaced along the front edges or terminal ends 58, 59 of the walls 38, 39 of the enclosure 44. Each of the retainer clips 332 can comprise a unitary structure comprising a top edge 363, a planar body 364, and outwardly extending leg 365 relative to the body 364. The clip 332 can be made from metal (i.e. stainless steel). A plurality of such retainer clips 332 can be positioned around the outer edge of the walls thereby providing an attachment means for the trim cap 34 and lens 42 to the walls 38, 39 of the enclosure 44. Retaining the trim cap 34 to the walls 38, 39 of the enclosure in turn provides the means for securing the lens 42 to the enclosure walls 38, 39 thereby providing a water resistant cover to the interior of the enclosure 44.

It is to be appreciated that the channel enclosure can be made from non-metal materials (i.e. rigid or semi-rigid plastics). Non-metal materials can be used in conjunction with clips 332 discussed herein.

Figure 16:
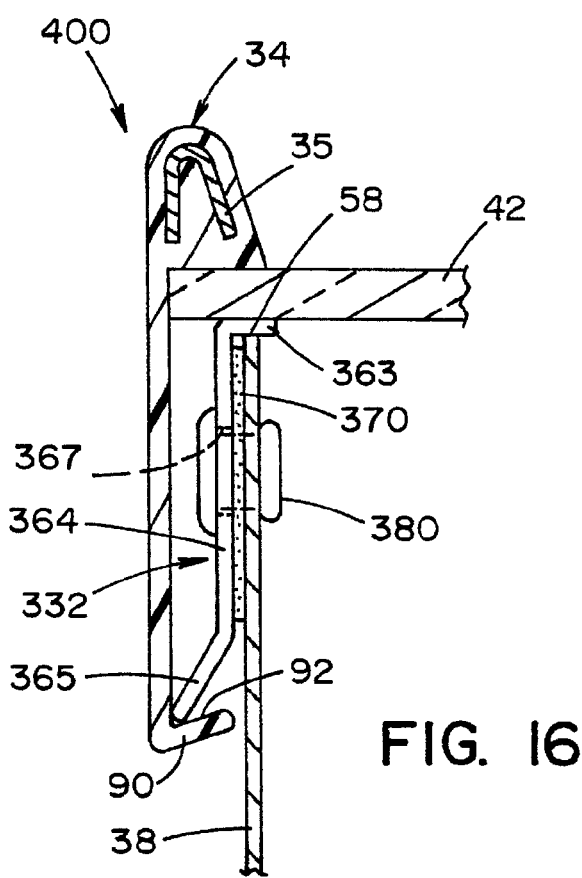
FIG. 16 is a cross sectional view of the channel letter assembly employing the retainer clip of FIG. 13 in accordance with the present invention.
Figure 17:
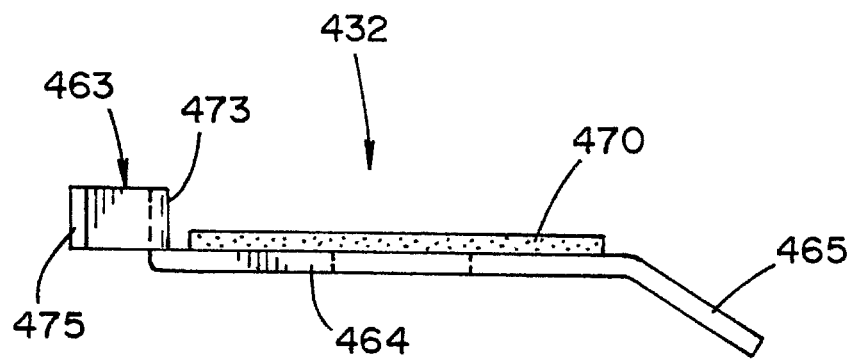
FIG. 17 is an edge view of a retainer clip according to a fourth embodiment.
Figure 18:
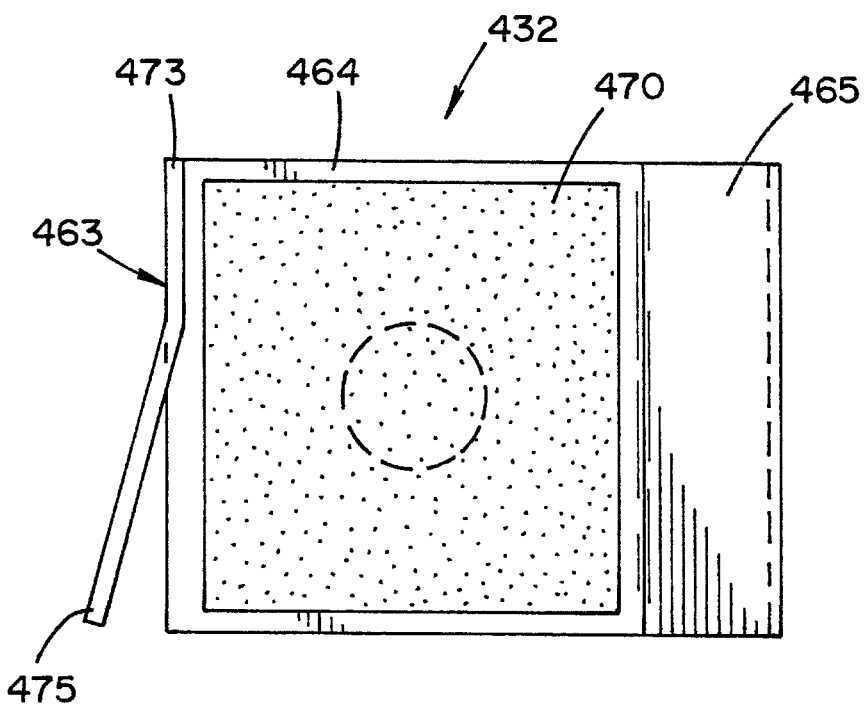
FIG. 18 is a front side view of the retainer clip of FIG. 17.
Figure 19:
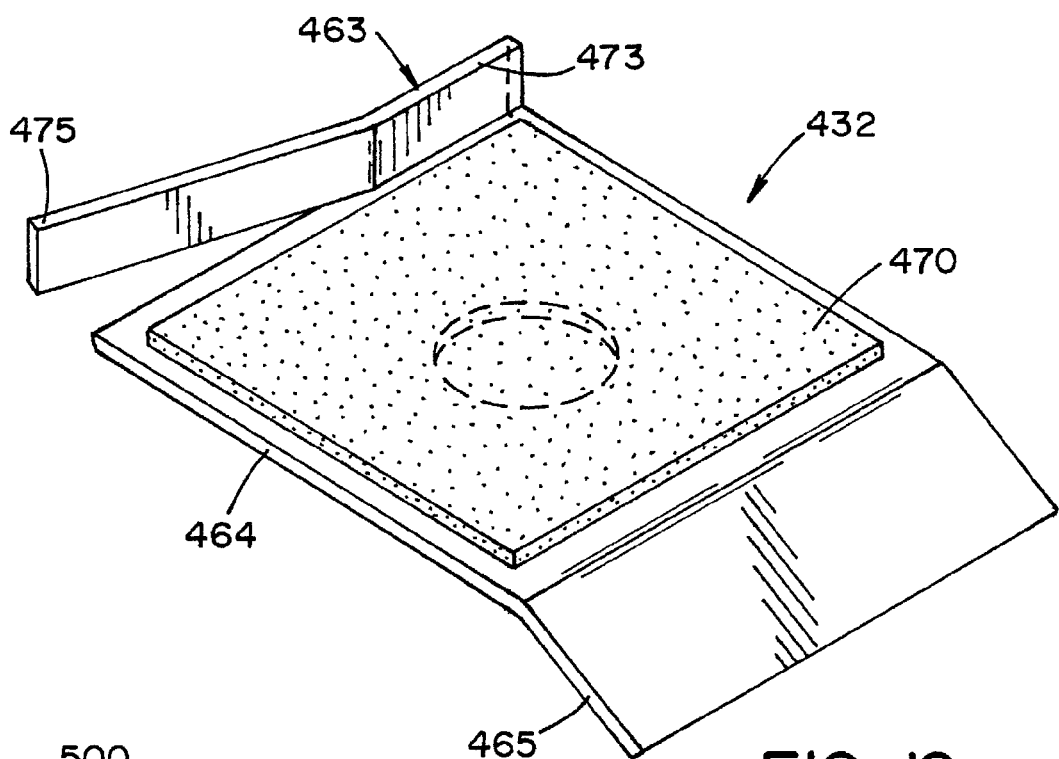
FIG. 19 is a perspective view of the retainer clip of FIG. 17.
Figure 20:
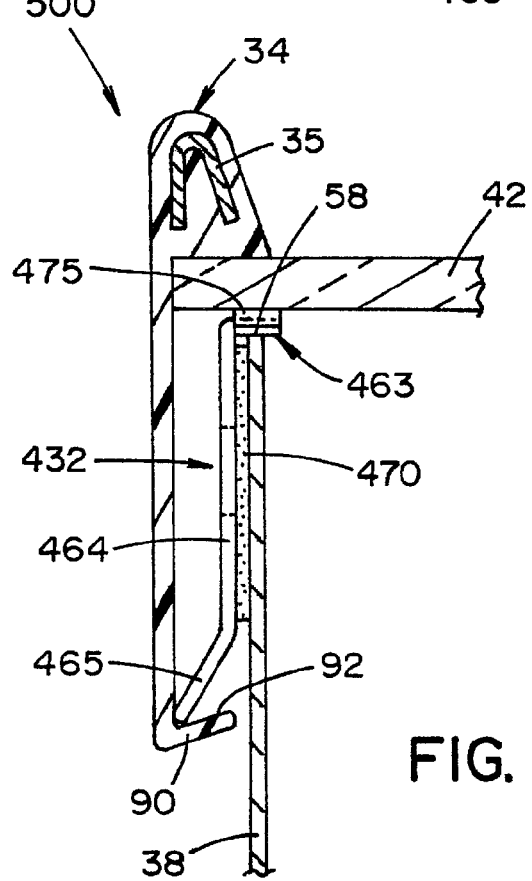
FIG. 20 is a cross sectional view of the channel letter assembly employing the retainer clip of FIG. 17 in accordance with the present invention; and, FIG. 21 is a cross sectional view of a third embodiment of trim cap to be employed with any of the retainer clips described in the present disclosure.

Referring to FIG. 16, the retainer clip 332 is fitted on the forward end 58 of a wall 38 with the leg 265 extending outward away from the wall 38. The retaining clip 332 can be easily installed with a double faced adhesive tape 370 secured to the inside of the body 364. When all the retainer clips 332 have been installed along the walls 38, 39 of the enclosure 44 the lens 42 can be positioned to rest on the outer surface of the top edge 363 of the clips 332. Referring to the figures, it is to be appreciated that after a retainer clip 332 has been installed, the top edge 363 will 'rest' against the front edge 58 of the wall 58 and along with the double faced adhesive tape 370 will resist removal of the retainer clip 332.

In accordance with the present invention, to retain the lens against the terminal ends of the shoulder a plurality of retainer clips 332 are spaced along the outer end of the walls of the enclosure. Each of the retainer clips 332 can comprise a unitary generally rigid body 364 having a first interior side and a second exterior side. The top edge 363, body 364, and leg 365 of the clip 332 can be made from rigid metal (i.e. stainless steel). Also, the top edge 363 can be at a generally 90 degree angle relative to the body 364. The top edge 363 resting on the front edge 58 of the wall 38, coupled with the double faced adhesive 370 secured between the body 364 and wall 38, resists removal of the clip 332. To further secure the clips 332 to the enclosure walls 38, 39, a rivet 380 or similar (FIG. 16) can be installed through the opening 367 in the body 364 of the clip 332 and through a corresponding wall 38, 39. A plurality of such retainer clips 332 can be positioned around the front edge of the walls thereby providing an attachment means for the trim cap to the walls of the enclosure. Retaining the trim cap (in place) in turn provides the means for securing the lens to the enclosure walls.

Referring to FIG. 16, the channel sign assembly 400 in accordance with the present disclosure, including a first embodiment of trim cap 34, is therein displayed. The assembly includes a metal enclosure 44 having a plurality of sheet metal side walls 38, 39. The retainer, snap cap, or trim cap 34 can be attached, i.e. firmly glued to the lens 42. The lens 42 and retainer cap 34 provide lateral support to the walls 38, 39. The lens 42 and the retainer cap 34 prevent the walls 38, 39 from moving towards each other and from bowing outward away from each other.

The clips 332, once installed, provide a tab or leg 265 that extends outward away from the walls 38, 39 of the channel and can engage a foot 90 of the retainer cap (i.e. in a 'snap cap' or friction engagement arrangement). The foot 90 can extend in a length from about ¼ inch to about 1¼ inches. The foot 90 of the retainer cap 34 can be in the form of a receiver or retention channel having a face 92 angled upward from about 3 degrees to about 9 degrees from horizontal. In one arrangement, the receiver can be angled upward from about 5 degrees to about 7 degrees from horizontal.

The clips 332 can be placed onto the channel walls 38, 39 at random positions around the letter or shape at the discretion of an installer. The number and intermittent spacing of the clips 332 will be dependent upon the size and design of the channel sign. The interlocking effect of the foot 90 of the retainer cap 34 to the tabs 365 will enable secure attachment of the plastic lens 42 and retainer cap 34 to the metallic channel 38, 39.

The tabs 65 of the clips 32 can be positioned such that they are aligned with and proximal to the front edge 58 59 of the side walls 38, 39. The adhesive securing the clips to the wall enables a positive engagement of the inside faces of the clips 32 to the forward edge and forward side portions of the metallic channel 38, 39.

Referring to FIGS. 17-20, and in accordance with the present disclosure, a channel letter assembly 500 having a retaining clip 432 (according to a fourth embodiment) is therein displayed. The clip 432 provides a means for securing a trim cap or retainer cap 34 to the walls 38, 39 of the enclosure 44. To facilitate retention of a lens 42 against the front edges 58, 59 of the walls 38, 39 of the enclosure 44, a plurality of the retainer clips 432 are spaced along the front edges or terminal ends 58, 59 of the walls 38, 39 of the enclosure 44. Each of the retainer clips 432 can comprise a unitary structure comprising a top edge 463, a planar body 464, and outwardly extending leg 465 relative to the body 464. The clip 432 can be made from metal (i.e. stainless steel). The top edge 463 can comprise a fixed portion 473 and a spring tensioned portion 475. In the mounted position (FIG. 20), the spring tensioned portion 475 provides on upward force to the lens 42 thereby increasing the securement force between leg 465 and foot 90. A plurality of such retainer clips 432 can be positioned around the outer edge of the walls thereby providing an attachment means for the trim cap 34 and lens 42 to the walls 38, 39 of the enclosure 44. Retaining the trim cap 34 to the walls 38, 39 of the enclosure in turn provides the means for securing the lens 42 to the enclosure walls 38, 39 thereby providing a water resistant cover to the interior of the enclosure 44.

Referring to FIG. 16, the retainer clip 432 is fitted on the forward end 58 of a wall 38 with the leg 465 extending outward away from the wall 38. The retaining clip 432 can be easily installed with a double faced adhesive tape 470 secured to the inside of the body 464. When all the retainer clips 432 have been installed along the walls 38, 39 of the enclosure 44 the lens 42 can be positioned to rest on the outer surface of the top edge 463 of the clips 432. Referring to the figures, it is to be appreciated that after a retainer clip 432 has been installed, the top edge 463 will 'rest' against the front edge 58 of the wall 38 and along with the double faced adhesive tape 470 will resist removal of the retainer clip 432.

In accordance with the present invention, to retain the lens against the terminal ends of the shoulder a plurality of retainer clips 432 are spaced along the outer end of the walls of the enclosure. Each of the retainer clips 432 can comprise a unitary generally rigid body 464 having a first interior side and a second exterior side. The top edge 463, body 464, and leg 465 of the clip 432 can be made from rigid metal (i.e. stainless steel). Also, the top edge fixed portion 473 can be at a generally 90 degree angle relative to the body 464. The top edge 463 resting on the front edge of the wall, the biased spring portion 475 coupled with the double faced adhesive 470 secured between the body 464 and wall 8, resists removal of the clip 432. A plurality of such retainer clips 432 can be positioned around the front edge of the walls thereby providing an attachment means for the trim cap to the walls of the enclosure. Retaining the trim cap (in place) in turn provides the means for securing the lens to the enclosure walls.

The tabs 465 of the clips 432 can be positioned such that they are aligned with and proximal to the front edge 58, 59 of the side walls 38, 39. The adhesive 470 securing the clips 432 to the wall enables a positive engagement of the inside faces of the clips 432 to the forward edge and forward side portions of the metallic channel 38, 39. The spring biased portion 475 increases the securement tension between the clip 432 and the trim cap 34.

FIG. 21 shows a cross-sectional view of a third embodiment of trim cap as could be employed with any of the retainer clips (not shown) described herein. Trim cap 534 can include a J-hook 536 for receiving (i.e. hooking) the edge 43 of lens 42. The J-hook 536 includes a curved portion 538 and a terminal end portion 540. The trim cap 534 further includes a foot 590 for engaging a leg of a clip (not shown). The foot 590 can be in the form of a receiver or retention channel having an angled face 592. The angled face 592 can be from above 3 degrees to about 45 degrees from horizontal. The angled face 592 and foot 590 provide a "snap fit" with a retainer clip leg thereby securing trim cap 534 to a clip, channel wall 38, and lens 42. Although not shown, it is to be appreciated that trim cap 534 can include a metal insert (i.e. aluminum) extending therethrough in order to provide rigidity and formability to the trim cap 534 shape. The metal insert can be positioned adjacent to an exterior side or imbedded within the interior of trim cap 534. The insert can extend through a portion of trim cap 534 or through substantially the entire cross section of trim cap 534.

While embodiments of the present disclosure have been disclosed, it will be appreciated that many modifications or variations may be made without departing from the true spirit and scope of the disclosure. It is, therefore, the intent of the pending claims to cover all such variations and modifications which fall within the true spirit and scope of the disclosure.

What is claimed:

1. A channel sign assembly comprising:
an enclosure having at least two opposing walls, said at least two opposing walls defining the shape of said sign assembly and having an open front;
said at least two opposing walls having an inner surface and a forward end;
said walls including a plurality of intermittent retention clips mounted adjacent to said forward end;
each said clip includes a unitary structure comprising a top edge, a planar body, and an outwardly extending leg relative to said body;
said legs are aligned with and offset from said forward end when each said clip is in a mounted position;
a planar lens having a forward surface, and an outer edge in said defined shape of said sign and sized to fit within said at least two opposing walls of said enclosure;
a retainer cap against said forward surface of said lens for retaining said lens within said enclosure and against said walls;
said retainer cap comprises an extrusion readily formable into a variety of shapes;
said retainer cap includes an interior face having a first edge and an opposing second edge;
said first edge having an overhang engaged with said forward surface of said lens; and,
said second edge forming a retention channel, wherein said channel adapted to securely engage a plurality of said legs along an outer surface of said enclosure walls.

2. A channel design pattern in accordance with claim 1, wherein each said clip comprises double faced adhesive tape including a first face of said tape secured to a mounting side of said body of said clip;
a second face of said tape secured to an outer surface of said walls; and,
said top edge generally at about 90 degrees to said body for resting on said forward end and stopping said clip at the proper mounting position.

3. A channel design pattern in accordance with claim 1, wherein said top edge includes a spring biased portion.

4. A channel sign assembly comprising:
an enclosure having at least two opposing walls, said at least two opposing walls defining the shape of said sign assembly and having an open front;
said at least two opposing walls forming a forward end;
said walls including a plurality of intermittent retention clips mounted adjacent to said forward end;
each said clip includes a unitary structure comprising a top edge, a planar body, and an outwardly extending leg relative to said body;
said legs are aligned with and offset from said forward end;
a planar lens having a forward surface and an outer edge in said defined shape of said sign; and,
a retainer cap mounted against said forward surface of said lens for retaining said lens within said enclosure and against said walls.

5. A channel sign assembly in accordance with claim 4, wherein said retainer cap comprises an extrusion readily formable into a variety of shapes;
said retainer cap includes an interior face having a first edge and an opposing second edge;
said first edge having an overhang engaged with said forward surface of said lens; and,
said second edge forming a retention channel, wherein said channel adapted to securely engage a plurality of said legs along an outer surface of said enclosure walls.

6. A channel sign assembly in accordance with claim 5, wherein said channel of said second edge includes a receiver adapted to receive said plurality of said legs, wherein said receiver is positioned at an angle from about 3 degrees to about 9 degrees from a horizontal plane wherein said horizontal plane is substantially perpendicular to said enclosure walls.

7. A channel sign assembly in accordance with claim 6, wherein said receiver includes partially flexible material extending inwardly from said interior face of said retainer cap, wherein said legs wedge between said retention channel and said exterior face of said enclosure walls when said retainer cap is fitted against said enclosure walls.

8. A channel sign assembly pattern in accordance with claim 4, wherein each said clip comprises double faced adhesive tape including a first face of said tape secured to a mounting side of said body of said clip;
a second face of said tape secured to an outer surface of said walls; and,
said top edge including a first portion generally at about 90 degrees to said body for resting on said forward end and stopping said clip at the proper mounting position.

9. A channel sign assemble pattern in accordance with claim 4, wherein said top edge includes a spring biased portion.

10. A channel sign assemble pattern in accordance with claim 8, wherein said top edge includes a second spring biased portion.

11. A channel sign assembly in accordance with claim 5, wherein said channel of said second edge includes a receiver adapted to receive said plurality of said legs, wherein said receiver includes partially flexible material extending inwardly from said interior face of said retainer cap.

12. A channel design pattern comprising:
an enclosure having at least two opposing walls;
said at least two opposing walls having an inner surface and a forward end;
a plurality of selectively positioned and oriented retention clips adjacent said forward end;
each said clip includes at least one outwardly extending leg relative to an outer surface of said wall;
a retainer cap against said forward surface of said lens for retaining said lens adjacent said enclosure and said walls;
said retainer cap includes an interior face having a first edge and an opposing second edge;
said first edge having an overhang engaged to said forward surface of said lens; and,
said second edge having channel, wherein said channel adapted to securely engage a plurality of said legs along an outer surface of said enclosure walls.

* * * * *